United States Patent [19]

Mullen

[11] 4,441,239

[45] Apr. 10, 1984

[54] METHOD FOR MANUFACTURE OF BEARINGS

[75] Inventor: Gerald H. Mullen, Burlington, Conn.

[73] Assignee: Virginia Industries, Inc., Rocky Hill, Conn.

[21] Appl. No.: 280,930

[22] Filed: Jul. 6, 1981

Related U.S. Application Data

[62] Division of Ser. No. 973,544, Dec. 26, 1978, Pat. No. 4,292,717.

[51] Int. Cl.³ ............................................. B21D 53/10
[52] U.S. Cl. ................................................ 29/148.4 A
[58] Field of Search ..................... 29/148.4 A, 148.4 C

[56] References Cited

U.S. PATENT DOCUMENTS

| | | | |
|---|---|---|---|
| 1,105,732 | 7/1914 | Graham | 29/148.4 A |
| 1,176,169 | 3/1916 | Schatz | 29/148.4 A |
| 1,176,170 | 3/1916 | Schatz | 29/148.4 A |
| 1,301,323 | 4/1919 | Schatz | 29/148.4 A |
| 1,451,531 | 4/1923 | Brunner | 29/148.4 A |
| 3,256,051 | 6/1966 | Howe | 29/148.4 A |
| 3,337,937 | 8/1967 | Sutowski | 29/148.4 A |
| 4,292,717 | 10/1981 | Mullen | 29/148.4 A |

Primary Examiner—Francis S. Husar
Assistant Examiner—V. K. Rising
Attorney, Agent, or Firm—Roger A. Van Kirk

[57] ABSTRACT

A process for manufacturing an unground bearing suitable for high-speed applications comprises forming a subassembly including the inner race, ball and retainer; the subassembly being fabricated in a fixture which receives the balls from a standard ball feeding machine. The subassembly is, after completion, removed from the fixture and positioned in one of the halves of a split outer race, the other half of the split outer race is placed over the subassembly and an outer shell is thereafter crimped over the outer races to hold the bearing together.

17 Claims, 4 Drawing Figures

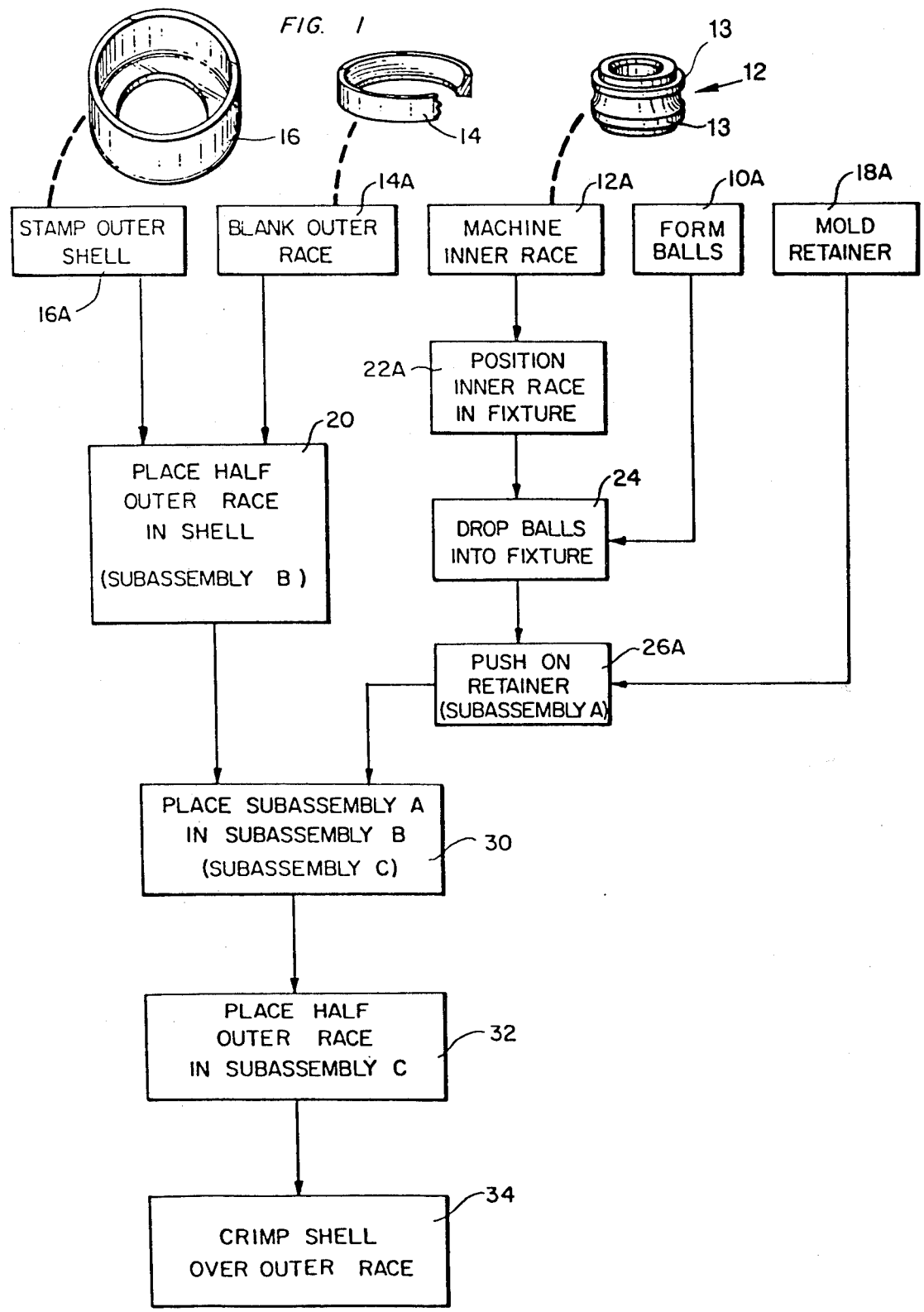

METHOD FOR MANUFACTURE OF BEARINGS

This is a division, of application Ser. No. 973,544, filed Dec. 26, 1978 now U.S. Pat. No. 4,292,717.

BACKGROUND OF THE INVENTION (1) Field of the Invention

The present invention relates to the manufacture of bearings and particularly to the assembly of unground bearings suitable for high-speed applications. More specifically, this invention is directed to the fabrication of bearings characterized by a split outer race and a ball retainer and the invention further comprises tooling for use in the production of a subassembly consisting of the bearing inner race, retainer and balls. Accordingly, the general objects of the present invention are to provide novel and improved methods and apparatus of such character.

(2) Description of the Prior Art

In the prior art a distinction has been made between comparatively expensive precision or "ground" bearings and relatively inexpensive "unground" bearings. An "unground" bearing, which is characterized by an outer race which is stamped rather than being precision machined, has not previously been considered to be suitable for high-speed applications and particularly for use where a significant level of bearing noise would be objectionable. A "ground" bearing, by virtue of its utilization of a precision machined outer race, is expensive because of the time consuming nature of the procedures incident to the assembly thereof and because of the added costs incident to the machining of the outer race. Both "ground" and "unground" bearings, and the method by which they are assembled, are well known in the art and will not be discussed herein. Suffice it to state that there has been a long felt need for a bearing having the capability of operation at comparatively high speeds with low noise which bearing could be assembled with moderate labor costs when compared to prior art "ground" bearing assembly techniques.

SUMMARY OF THE INVENTION

The present invention overcomes the above briefly discussed deficiencies of the prior art by providing a novel unground bearing suitable for high-speed applications. The present invention also contemplates unique tooling for use in the assembly of high-speed unground bearings.

A bearing manufactured in accordance with the present invention is characterized by a split outer race and a ball retainer. Ground bearings previously produced commercially have included a retainer but have not employed a split outer race. Previously available unground bearings have, in some instances, employed a split outer race but have not incorporated a retainer; i.e., the space between the inner and outer races of previous unground bearings has been filled with balls as opposed to having a partial complement of balls and a retainer.

In accordance with the present invention, a subassembly consisting of a machined inner race, the balls and a metal or plastic retainer is formed in a fixture. The fixture has a novel design which permits the balls to be delivered thereto from a standard ball feeding device; the fixture directing the balls into precisely the proper relative positions where they are in contact with the ball track; i.e., the raceway; of the inner race and are prevented from moving in a circumferential direction. Thereafter, the retainer is pressed into position to capture the balls. The inner race-ball-retainer subassembly, which may be handled, is thereafter positioned in a first half of the split outer race, the second half of the split outer race is placed over the subassembly and the entire bearing is completed by joining the halves of the split outer race.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 1 is a flow diagram which depicts the assembly of a high-speed unground bearing in accordance with the present invention;

DESCRIPTION OF THE PREFERRED EMBODIMENT

Figure 2A:
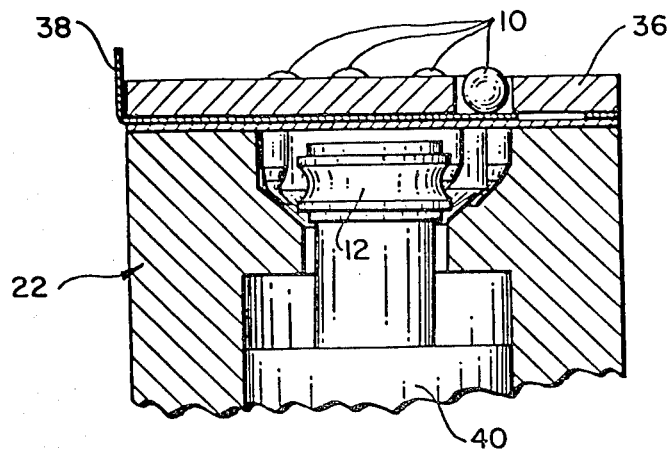
FIG. 2A is a cross-sectional, side elevation view of a novel tool for use in formation of a bearing subassembly in accordance with the process of FIG. 1.

With reference now to the drawing, the components of a bearing produced in accordance with the present invention are individually fabricated by conventional manufacturing techniques. Thus, the balls 10 (see FIGS. 2 and 3) are formed by means of a conventional repetitive grinding process indicated at 10A in FIG. 1. The inner race defining member 12 will typically be formed by a process which includes machining the part and case hardening the finished part. Formation of the inner race defining member 12 may also include a roller burnishing step to achieve the desired finish. The step of fabrication of the inner race is indicated at 12A. The halves of the outer race, one of which is depicted in perspective and partial cross-section at 14 in FIG. 1, will be produced from a strip of material by means of a process which includes the steps of blanking a disc from the strip, punching a hole in the disc and thereafter forming the part into the requisite half-race shape which may be seen from FIG. 1. The formation of the outer race segments includes swaging and coining operations which will give the desired radius and finish to the parts whereby they will possess the same finish characteristics as the inner race. Subsequent to forming, the inner race segments will be case hardened. The formation of the outer race has been indicated in FIG. 1 as step 14A. A "soft" outer shell 16, also shown in perspective in FIG. 1, is formed in step 16A by a stamping procedure. For the reason to be explained below, shell will be over-sized so that the outer race segments 14 fit loosely therein. The retainer, an example of which is indicated in FIG. 3 at 18, is formed from a suitable plastic, as indicated at step 18A, by a technique such as injection molding.

The assembly of a bearing in accordance with the process of FIG. 1 contemplates the "simultaneous" formation of subassemblies. Thus, as indicated at step 20, one of the outer race defining members 14 will be placed in an outer shell 16 to form a subassembly B.

This subassembly B will then be positioned to receive a subassembly A assembled in the manner to be described below.

The inner race 12 is positioned, as shown in FIG. 2A, in a fixture which has been indicated generally at 22; the step of placing the inner race in the fixture being indicated in FIG. 1 at 22A. The fixture 22 will be described in greater detail below. The inner race defining member has a body portion which is machined, as noted above, to form a pair of lands 13, 13' (see FIG. 1) which define therebetween the inner raceway which is in the form of an arcuate groove having a radius complementary with that of the bearings. The lands, as can be seen from FIGS. 1 and 2, are of identical size and shape and have outwardly facing sides which define a cylinder coaxial with the member. After positioning the inner race 12 in the fixture, the requisite number of balls 10 are delivered thereto and, because of the design of the fixture, the balls will drop into positions wherein they contact the ball track of the inner race and are prevented from circumferential movement. The step of delivering the balls to fixture 22 has been indicated at 24 in FIG. 1. Thereafter, subassembly A is completed, thus producing the article indicated generally at 26 in FIG. 3, by urging the plastic retainer 18 over the balls as indicated at step 26A. The retainer 18 will, due to its shape and resiliency, snap into position over the balls which have been captured in the appropriate positions in fixture 22; the balls thus being prevented from radial movement and from relative circumferential movement by the retainer and the retainer and balls being held in the ball track of the inner race.

After subassembly A; i.e., the article 26 shown in FIG. 3; is completed, it will be ejected from the fixture 22 and placed within the subassembly B wherein the balls will be in contact with one of the halves 14 of the outer race. The mating of subassemblies A and B, to form a further subassembly C, is indicated in FIG. 1 at 30. The assembly of the bearing is completed by dropping a second outer race defining member 14 over subassembly C, as indicated at step 32, and thereafter forming the outer shell 16 about this second outer race defining member, as indicated at step 34, to hold the outer race together. The step of forming the shell over the outer race includes shrinking the shell to align the outer race defining members and crimping the open end of the shell inwardly. This procedure will cause the halves 14 of the outer race to be in peripheral abutting relationship at their maximum inner diameters. It is to be understood that techniques other than employment of an outer shell may be utilized to position and hold the outer race halves with respect to subassembly 26 (FIG. 3).

Figure 2B:
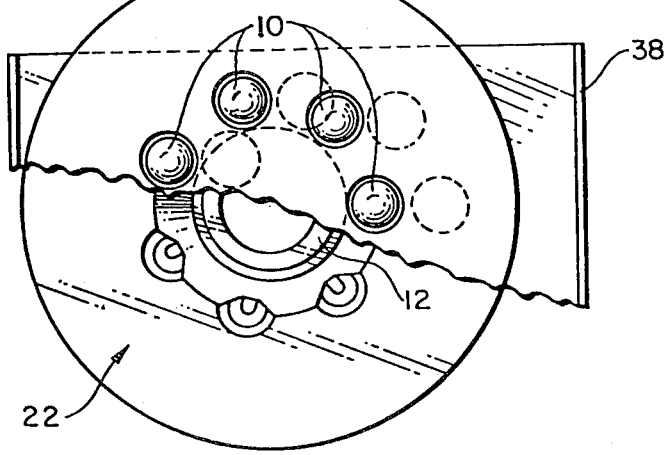
FIG. 2B is a top view, with the ball feeding device partly broken away, of the novel fixture of the tool of FIG. 2A.
Figure 3:
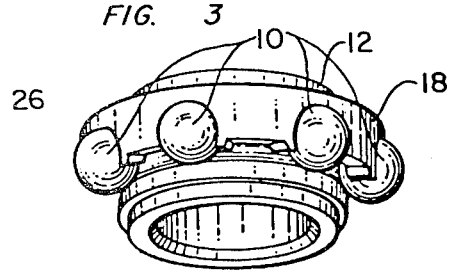
FIG. 3 is a perspective view of a bearing subassembly A produced in accordance with the method of FIG. 1 and employing the tooling of FIGS. 2A and 2B.

Referring again to FIG. 2A, and also simultaneously to FIG. 2B, the fixture 22 is provided with a cylindrical central bore having portions 44 and 46 of different diameter joined by a frustoconical shaped intermediate section 48. The inner race 12 is dropped into the larger diameter end 44 of the bore in fixture 22 and will be centered by the conical intermediate wall section 46. The inner race 12 will, when seated in fixture 22, be supported on the reciprocal plunger 40 of an ejector mechanism which operates through the smaller diameter portion 46 of the bore in fixture 22. The walls of the larger diameter cylindrical portion 44 and the intermediate section 48 of the bore in fixture 22 are machined to define spaced "pockets" commensurate in number with the number of balls to be included in the bearing. These "pockets", which are open to the bore in the fixture and have axes which are parallel to the axis of the fixture bore, are characterized by straight semi-cylindricl vertical walls which converge inwardly toward the base; the converging portions of the walls of the pockets having a double conical shape in the disclosed embodiment. For example, from the lower end of the vertical wall portion, the walls of the "pockets" may first slope inwardly at an angle of 30° as indicated at 50 in FIG. 2B and thereafter slope inwardly at an angle of 45° with respect to the vertical as indicated at 52. The size and shape of the "pockets" in the side wall of the bore in fixture 22 will permit the balls 10 to clear the upper race defining land on inner race defining member 12 and, once below the upper land or shoulder, the balls will be guided downwardly and inwardly against the raceway and the flat bottom portion 54 of the "pockets". The pocket may be formed employing an end mill with a double taper and a flat top. The balls are delivered to fixture 22 by means of a standard ball feeding device which has been indicated schematically at 36; the ball feeding device 36 including a mechanism such as a sliding door 38 which releases the requisite number of balls into fixture 22 from positions generally aligned vertically with the abovedescribed "pockets".

Once the balls have been released into the fixture 22, registration between the ball feeding device 36 and fixture 22 is terminated and the plastic retainer 18 is placed in the fixture and snapped into position over the balls. This operation can be performed manually or automatically. Thereafter, the plunger 40 is employed to eject the subassembly 26 from fixture 22 and the process will be repeated to form subsequent inner race-ball-retainer subassemblies.

While a preferred embodiment has been shown and described, various modifications and substitutions may be made thereto without departing from the spirit and scope of the invention. Accordingly, it is to be understood that the present invention has been described by way of illustration not limitation.

What is claimed is:

1. A method for the manufacture of a bearing comprising the steps of:

placing an inner raceway defining member in a fixture, the inner raceway defining member having an axis and a pair of spaced lands having a raceway defining groove therebetween, said lands extending outwardly from a body portion;

delivering balls to the fixture;

directing the balls downwardly about the outwardly facing end of an upper land on the inner raceway defining member and then directing the balls downwardly and inwardly toward the axis of the member to establish contact between the balls and a plurality of evenly spaced locations on the raceway surface between the lands;

impeding circumferential movement of the balls after contact with the raceway surface is established;

inserting a retainer over the balls to prevent radial movement thereof, the retainer engaging each of the balls and maintaining the circumferential spacing thereof;

positioning the subassembly comprising the retainer, balls, and inner raceway defining member in a first annular member which defines a first portion of the bearing outer raceway;

placing a second annular member which defines the remainder of the bearing outer raceway over the said subassembly; and securing the annular members together.

2. The method of claim 1 wherein the annular members are of identical size and shape and wherein said method further comprises the step of:

forming the annular members from a strip of material.

3. The method of claim 2 wherein the step of forming comprises:

stamping disc shaped elements from a metallic strip;
punching a hole through the elements;
providing a curved bearing surface having a desired finish on the elements; and
hardening the elements.

4. The method of claim 2 wherein the step of providing a bearing surface includes:

coining the elements to provide a surface finish commensurate with the inner raceway finish.

5. The method of claim 1 wherein the step of securing comprises:

capturing the annular members in an outer shell.

6. The method of claim 5 further comprising:

forming a second bearing subassembly by positioning the first annular member on a radially inwardly extending shoulder of the outer shell; and wherein the step of capturing comprises:

shrinking the shell to align the facing edges of the bearing surfaces on the annular members; and crimping the shell over the outwardly disposed end of the second annular member.

7. The method of claim 6 wherein the annular members are of identical size and shape and wherein said method further comprises the step of:

forming the annular members from a strip of material.

8. The method of claim 7 wherein the step of forming comprises:

stamping disc shaped elements from a metallic strip;
punching a hole through the elements;
providing a curved bearing surface having a desired finish on the elements; and
hardening the elements.

9. The method of claim 8 wherein the step of providing a bearing surface includes:

coining the elements to provide a surface finish commensurate with the inner raceway finish.

10. The method of claim 1 further comprising the step of:

machining the inner raceway defining member.

11. The method of claim 1 further comprising the step of:

injection molding the retainer from plastic.

12. The method of claim 10 further comprising the step of:

injection molding the retainer from plastic.

13. The method of claim 12 wherein the annular members are of identical size and shape and wherein said method further comprises the step of:

forming the annular members from a strip of material.

14. The method of claim 13 wherein the step of forming comprises:

stamping disc shaped elements from a metallic strip;
punching a hole through the elements;
providing a curved bearing surface having a desired finish on the elements; and
hardening the elements.

15. The method of claim 14 wherein the step of providing a bearing surface includes:

coining the elements to provide a surface finish commensurate with the inner raceway finish.

16. The method of claim 15 wherein the step of securing comprises:

capturing the annular members in an outer shell.

17. The method of claim 16 further comprising:

forming a second bearing subassembly by positioning the first annular member on a radially inwardly extending shoulder of the outer shell; and wherein the step of capturing comprises:

shrinking the shell to align the facing edges of the bearing surfaces on the annular members; and crimping the shell over the outwardly disposed end of the second annular member.

* * * * *